United States Patent [19]

Biles

[11] Patent Number: 5,329,323
[45] Date of Patent: Jul. 12, 1994

[54] APPARATUS AND METHOD FOR PRODUCING 3-DIMENSIONAL IMAGES

[76] Inventor: Kevin Biles, 13364 Beach Ave., Marina del Rey, Calif. 90292

[21] Appl. No.: 857,235

[22] Filed: Mar. 25, 1992

[51] Int. Cl.⁵ .............................................. G03B 21/00
[52] U.S. Cl. ....................................... 353/10; 353/30; 359/449; 359/478
[58] Field of Search ................... 353/7, 10, 30, 37, 94; 359/458, 449, 462, 466, 471, 475, 477, 478, 479; 352/86, 61, 57

[56] References Cited

U.S. PATENT DOCUMENTS

| | | | |
|---|---|---|---|
| 663,266 | 12/1900 | Fitch | 353/30 |
| 1,394,797 | 10/1921 | Smith | 353/10 |
| 2,625,852 | 1/1953 | Van Orden | 353/37 |
| 2,952,182 | 9/1960 | Marks et al. | 353/10 |
| 3,006,241 | 10/1961 | Marks et al. | 353/10 |
| 3,844,645 | 10/1974 | Forster, Jr. | 353/10 |
| 4,974,957 | 12/1990 | Kaelin | 353/10 |
| 5,024,521 | 6/1991 | Zuchowski et al. | 352/86 |

FOREIGN PATENT DOCUMENTS 0337881 10/1989 European Pat. Off. ................ 353/7

Primary Examiner—William A. Cuchlinski, Jr.
Assistant Examiner—William C. Dowling
Attorney, Agent, or Firm—Poms, Smith, Lande & Rose

[57] ABSTRACT

Systems and methods for producing the sensation of 3-dimensional viewing by projecting and displaying a foreground image and a background image onto separate projection screens positioned on a single viewing axis are disclosed. The images are viewed simultaneously and appear as a single image having depth characteristics. The foreground image screen and the background image screen are provided with image transmission, reflection, and absorption characteristics which allow for simultaneous viewing of more than one screen without image "bleed" or excessive loss of image intensity.

21 Claims, 1 Drawing Sheet

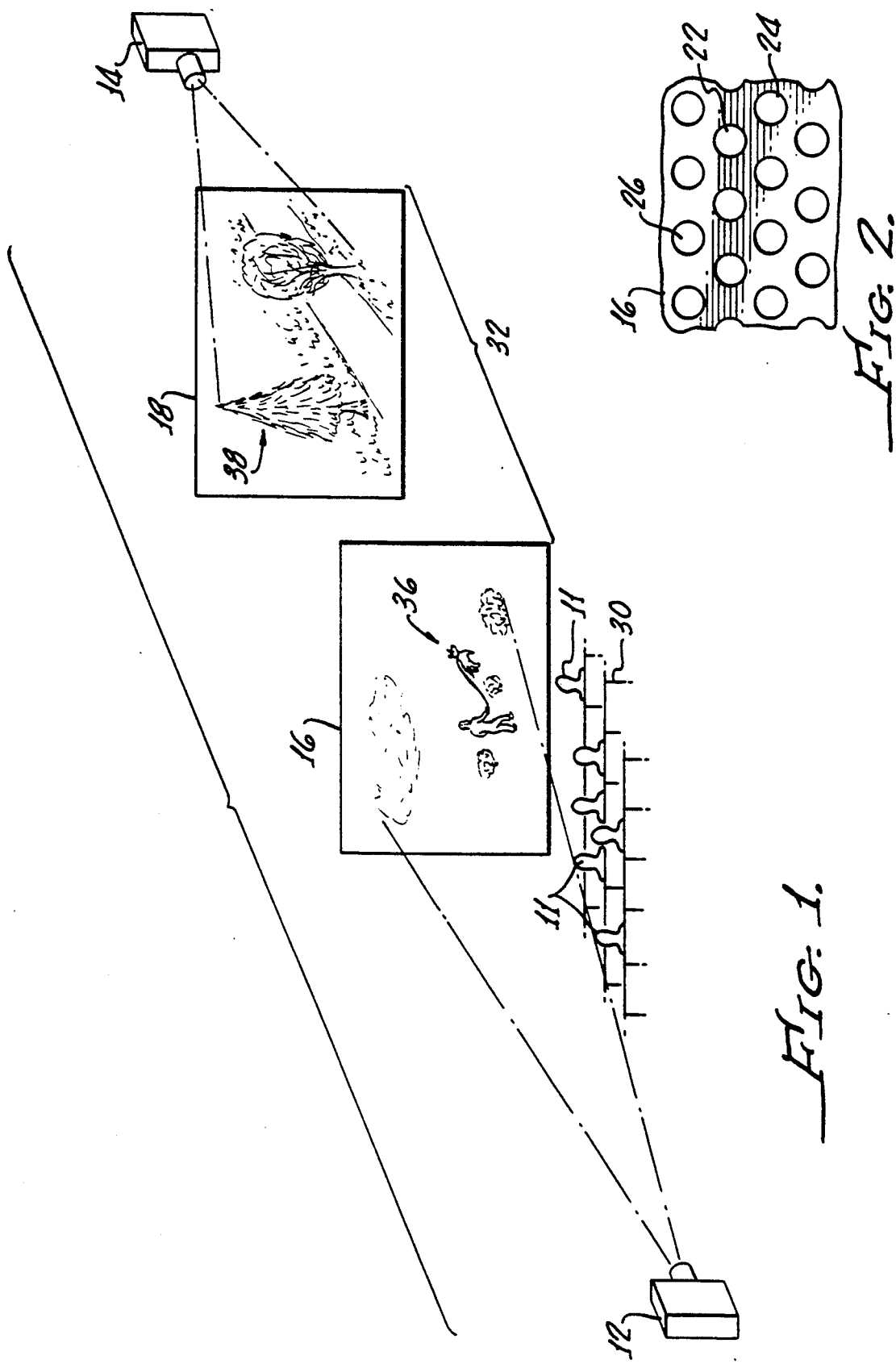

APPARATUS AND METHOD FOR PRODUCING 3-DIMENSIONAL IMAGES

BACKGROUND OF THE INVENTION

1. Field of the Invention

The present invention relates generally to systems for producing apparent 3-dimensional viewing. More particularly, the present invention relates to apparatus useful for projecting and displaying images onto separate projection screens positioned on a single viewing axis in such a manner as to provide audiences with a sensation of 3-dimensional viewing.

2. Description of Related Art

For many decades the motion picture and video display industries have attempted with various degrees of success to provide viewing systems which give a sensation of depth or 3-dimensional viewing to the audience. One early approach involved provided a greater visual depth for viewers and consisted of increasing the projection screen width relative to its height and curving the screen. This provided a viewing area very close to the normal visual range and additionally created increased depth illusion.

Another approach is known as stereoscopic viewing and consists of simultaneously projecting images, photographed at different angles, onto a screen through polarizing filters which are oriented at right angles to each other. Viewers are required to wear a pair of special polarizing viewing spectacles which allows each eye to see only one image. The viewer's brain combines the images so that a resultant image having apparent 3-dimensional characteristics is observed.

Another system for creating 3-dimensional viewing is described in U.S. Pat. No. 2,952,182 and consists of projecting one image on a front screen and projecting a second image on a back screen which is located directly behind the front screen. In order for a viewer to observe the images projected on both screens, the front screen is formed of a wire mesh material which is painted with white pigment on the front, to maximize reflection, and painted black on the back to maximize absorption. The rear screen is a rear projection screen and allows light to pass through it so that it appears to originate from the screen. In order to avoid image "bleed" created by light from the front screen passing through the mesh and reflecting from the rear screen, a filter is positioned between the front and rear screens and at an angle to the front screen. This filter reflects about 80% of the light striking it while allowing sufficient light to pass through so that the viewer can observe the back screen. A real drawback associated with this system is the reduced visualization of the back screen caused by the presence of the filter. That is, only a small percentage of the light originating from the rear screen is transmitted to the viewer opposite the front screen, resulting in low intensity images.

Accordingly, it is an object of the present invention to provide a system for 3-dimensional viewing which does not require viewers to wear stereoscopic viewing spectacles.

It is also an object of the present invention to provide a system for 3-dimensional viewing without image "bleed".

It is further an object of the present invention to provide a system for 3-dimensional viewing which does not require filtering screens.

It is another object of the present invention to provide a system for 3-dimensional viewing which can be constructed economically and easily in motion picture auditoriums having a variety of sizes and dimensions.

SUMMARY OF THE INVENTION

The present invention accomplishes the above-mentioned objectives and others by providing a system for 3-dimensional viewing by projecting at least two related images on to at least two associated projection screens. The at least two images are viewed simultaneously by viewers and appear as a single image having depth characteristics. Generally, one image is a foreground image which is projected on a foreground projection screen, and a second image is a background image which is projected on a background screen positioned a distance behind the foreground projection screen. As a feature of the present invention, the foreground screen and the background screen are provided with image transmission, reflection, and absorption characteristics which allow for simultaneous viewing of more than one screen without image "bleed" or excessive loss of image intensity.

More particularly, the present invention provides a system for apparent 3-dimensional viewing which includes a device for projecting a foreground image, a device for projecting a background image, a front projection screen, and a back projection screen. The front projection screen is characterized by a plurality of perforations which are sized and spaced so that the screen reflects a sufficient amount of the foreground image and transmits a sufficient amount of the background image for visualization by an audience of viewers. The back projection screen is positioned so that is viewed simultaneously with the front projection screen. Further, the back projection screen is capable of receiving and transmitting the background image so that is visualized by the audience. In order to eliminate foreground image "bleed" the back projection screen is capable of absorbing any of the foreground image transmitted from the front projection screen.

Advantageously, the system for producing an apparent 3-dimensional image of the present invention is easily adapted to motion picture auditoriums where space allows. Alternatively, the system of the present invention can be installed in auditoriums having a wide range of sizes and can be adapted to viewing audiences ranging in number from one to several thousand. An important advantage associated with the system of the present invention is the wide viewing angle which can be achieved. Thus, even with a somewhat limited screen width, visualization can be achieved at such wide angles that larger audiences can be accommodated.

In preferred embodiments of the present invention, the background image and the foreground image are filmed separately with its own lighting and depth perspective. Thus, when each image is projected on its associated screen, it appears in a plane having its own inherent perspective. When viewers simultaneously view the screens, the images are combined to provide a resulting composite image with the illusion of a complete scene with depth characteristics.

The various features and advantages of the present invention will become apparent from the following detailed description, taken in conjunction with the accompanying drawings which illustrate, by way of example, the principles of the present invention.

BRIEF DESCRIPTION OF THE DRAWINGS

FIG. 1 view in perspective of a system for producing 3-dimensional viewing of the present invention including first and second image projectors and front and back projection screens.

FIG. 2 illustrates an enlarged section of an exemplary perforated front projection screen utilized in the system of the present invention.

DETAILED DESCRIPTION OF EXEMPLARY EMBODIMENTS

The present invention is based upon the discovery that certain perforated front projection screens used in combination with rear projection screens can be utilized to provide viewers with composite images which give the illusion of 3-dimensional viewing. The perforated front projection screen and the rear projection screen are positioned along a single viewing axis and provide viewers with simultaneous high quality visualization of background and foreground images without image "bleed" and without the need for specialized light filters.

Referring to FIG. 1 there is illustrated a system for producing apparent 3-dimensional viewing according to the present invention which includes, a device 12 for projecting a first image 36, a device 14 for projecting a second image 38, a perforated front projection screen 16 separated by distance 32 from a back projection screen 18. Perforated front projection screen 16 is positioned to receive and reflect the first image 36, and has a plurality of perforations which are sized and spaced apart so that the front projection screen reflects a sufficient amount of the first image 36 and transmits a sufficient amount of the second image 38 for visualization by viewers 11 positioned in viewing area 30. Back projection screen 18, positioned forward of device 14 for projecting a second image 38, is capable of receiving and transmitting sufficient amounts of the second image 38 for visualization by viewers 11. The back projection screen 18 is further capable of absorbing sufficient amounts of any first image 36 transmitted by the perforated front projection screen 16 thereby avoiding first image "bleed".

By combining the unique features of perforated front projection screen 16 and back projection screen 18, viewers 11 observe a first image 36 on perforated front projection screen 16 and simultaneously view a second related image 38 on back projection screen 18. The resulting composite image is that of a full scene having depth characteristics which resemble 3-dimensional viewing. In most embodiments of the present invention, first image 36 is a foreground image of the composite image and second image 38 is a background image of the composite image.

Exemplary embodiments of the present invention utilize perforated front projection screens 16 and back projections screens 18 which are substantially equal in size and planar, although screens having curved surfaces are contemplated as being within the scope of the present invention. Additionally, although typically screens 16 and 18 have substantially equal dimensions, back projection screen 18 can be enlarged in order to provide viewers positioned at wide angles to view second image 38 without the inconvenience associated with observing the edge of the back projection screen. Distance 32 between screen 16 and 18 varies with the size of the screens and the size and shape of the viewing area. Exemplary embodiments of the present invention include screen sizes which vary from 2 feet to 80 feet in height and from 3 feet to 110 feet in width. Associated distances 32 vary from 3 feet to greater than 30 feet. Those skilled in the art will appreciate that viewing audiences and viewing auditoriums can vary substantially in size, and the particular features of the present invention, including screen sizes and the distance between the screens, are adaptable to a wide spectrum of viewing areas.

Perforated front projection screens 16 are typically formed of a vinyl polymer to a thickness of less than 10 mils. As illustrated in the enlarged plan view of the perforated front projection screen 16 of FIG. 2, perforations 22, 24, 26 generally evenly spaced circular through holes disposed over the entire viewing surface of the front projection screen 16. Perforated front projection screens having background image transmission characteristics and foreground image reflecting characteristics suitable for high quality visualization of both images vary in their perforation size and spacing. A number of factors determine the perforation size and spacing, including the size of projecting screens 16 and 18, the amount of ambient lighting, and the size of the viewing field. However, typical general use perforated front projection screens are from about 35% to about 50% perforated and have from about 10 to about 14 perforations per square centimeter. Typical exemplary perforation sizes range from about 2 mm to about 4 mm. Preferred perforated front projection screens are known as a 60/40 perforation and have about 12 perforations per square centimeter with each perforation sized about 2 mm.

As shown in FIG. 1, back projection screen 18 is generally positioned behind and parallel with front projection screen 16. Suitable back projection screens 18 which in combination with perforated front projection screens 16 described above provide effective high quality 3-dimensional viewing, are screens which transmit a high percentage of the light passing from device 14. Moreover, images from device 14 appear to originate from back projection screen 18 by viewers 11 who are capable of observing back projection screen 18 because of the unique perforation characteristics of front projection screen 16. In addition to transmitting a substantial amount of the light, and thus images, projected from device 14, back projection screen 18 absorbs substantial amounts of light striking its front surface 28. Accordingly, images projected by device 12 and transmitted through perforated front projection screen 14 are absorbed at surface 28, thereby eliminating any image bleed which can severely distort the final composite image. Exemplary back projection screens 18 transmit from 90%–95% of the light striking surface 30 and absorb from 90%–95% of the light striking surface 28.

Back projection screens 18 are known in the art as rear projection screen and are typically utilized in viewing conditions having significant amounts of ambient lighting. Since ambient light contacting surface 28 of back projection screen 18 is absorbed and not reflected, and images projected onto back surfaces 40 are transmitted, audiences generally are less bothered under high ambient lighting conditions. Commercially sold by a number of sources including Raven, Stewart Film Screens, and DA-LITE, these screens are available in a variety of sizes and a variety of sensitivities to projected light, a characteristic known as gain. Gain refers to the degree to which transmitted light is diffused, with higher gains diffusing less than lower gains. Typically, larger, and particularly wider screens, are installed in areas designed for larger viewing audiences. The wider the back projection screen, the lower the gain of the screen material and the higher the degree of light diffusion. On the other hand, smaller viewing audiences typically utilize smaller and narrower back projection screens with a lower gain. A consequence of the various gain configurations is that lower gain screens which diffuse light to a greater degree require a high intensity of projected image. Conversely, higher gain screens which are also more transparent will effectively transmit high quality images which are projected with less intensity.

As already mentioned, the systems of producing apparent 3-dimensional images of the present invention can be sized for viewing audiences ranging from only a few viewers to many thousand viewers. A particularly advantageous aspect of the present invention is the ease at which motion picture auditoriums can be altered to accommodate the various elements of the present invention. Accordingly, even though devices 12 and 14 for projecting first and second images, respectively, can be sources for video type projection of images, including laser video, the preferred configuration of devices 12 and 14 is film projection typically utilized in the motion picture industry. A preferred image source is 35 mm panavision and devices 12 and 14 are film projectors known in the art and suitable for projecting images from motion picture film.

In preferred exemplary embodiments of the present invention, device 12 is utilized to project a foreground image and device 14 is utilized to project a background image. As those skilled in the art will appreciate, in order to effectively achieve the appearance of depth associated with 3-dimensional viewing, the background and foreground images are preferably filmed separately. That is, that part of the composite image which contributes to the background appears only in the image projected from device 14 and the image projected from device 12 includes only that part of the composite image which contributes to the foreground.

An exemplary process for producing high quality 3-dimensional viewing in accordance with the present invention, includes providing foreground imaging film for device 12 and providing background imaging film for device 14, and then simultaneously projecting a foreground image to perforated front projection screen 16 and a background image to back projection screen 18. Viewers 11 view the foreground image from perforated front projection screen 16. Simultaneously, viewers 11 observe the background image which appears to originate in the plane of the back projection screen 18 through the perforated front projection screen 16. The resulting composite image has the appearance of 3-dimensional like depth.

Another advantage associated with producing 3-dimensional viewing with the system taught herein lies in utilizing the space provided by the distance 32 between screens 16 and 18. For example, actors or puppets can perform live action in this space, thereby augmenting the entertainment appeal of the system. Moreover, live special effects such as laser light shows provide audiences with unique live-type entertainment while attending motion picture presentations.

The following non-limiting example illustrates a suitable combination of perforated front projection screen and back projection screen useful for producing high quality visualization of apparent 3-dimensional images according to the present invention.

EXAMPLE

In an viewing auditorium sized for a viewing audience of about 1500, a 60/40 perforation front projection screen measuring 45 feet in width and 25 feet in height was placed 25feet forward of a standard low gain back projection screen which also measured 45 feet in width and 25 feet in height. A front projector was placed a distance in front of the perforated front projection screen for projecting a sharp foreground image to the perforated front projection screen. A back projector was placed behind the back projection screen an appropriate distance for projecting a sharp background image to the back projection screen. Audience viewers seated at angles up to 30° to the side of the perforated front projection screen were able to view the images and perceive the apparent 3-dimensional composite image. Thus, viewing angles of up to 120° were obtained using the system of the present invention.

Having thus described exemplary embodiments of the present invention, it should be noted by those skilled in the art that the disclosures herein are exemplary only, and that alternative, adaptations, and modifications may be made within the scope of the present invention.

I claim:

1. A system for producing apparent 3-dimensional viewing, said system comprising:

a means for projecting a first image;

a means for projecting a second image;

a perforated front projection screen positioned to receive and reflect said first image and to transmit said second image, said front projection screen having a plurality of perforations sized and spaced apart so that said front projection screen reflects a sufficient amount of said first image and transmits a sufficient amount of said image for visualization by viewers positioned forward of said front projection screen;

a back projection screen positioned parallel with said perforated front projection screen, and back projection screen being capable of receiving and transmitting a sufficient amount of said second image for visualization and being capable of absorbing said first image transmitted from said front projection screen;

wherein said front projection screen is a 60/40 perforation screen and has through hole perforations sized about 2 mm in diameter; and wherein said back projections screen is a rear projection screen capable of transmitting at least about 80% of said second image and capable of absorbing at least about 90% of said first image.

2. The system for producing apparent 3-dimensional viewing of claim 1 wherein said means for projecting a second image is a motion picture film projector.

3. The system for producing apparent 3-dimensional viewing of claim 1 wherein said means for projecting a first image is a motion picture film projector.

4. The system for producing apparent 3-dimensional viewing of claim 1 wherein said first image is a foreground image.

5. The system for producing apparent 3-dimensional viewing of claim 1 wherein said second image is a background image.

6. The apparent 3-dimensional viewing system of claim 1 wherein said means for projecting said second image is a motion picture projector.

7. The apparent 3-dimensional viewing system of claim 1 wherein said 60/40 perforation front projection has about 12 perforations per square centimeter.

8. The apparent 3-dimensional viewing system of claim 1 wherein said front projection screen and said back projection screen are separated by a distance of from about 2 feet to about 30 feet.

9. A system for producing apparent 3-dimensional viewing, said system comprising:
   a means for projecting a foreground image;
   a means for projecting a background image;
   a 60/40 perforations front projection screen positioned to receive and reflect said foreground image and to transmit said background image, said 60/40 perforation front projection screen having 12 to 14 perforations per square centimeter each of said perforations having a diameter of about 2 mm; and
   a rear projection screen positioned parallel with said 60/40 perforation front projection screen, said rear projection screen being capable of receiving and transmitting at least 90% of said background image and absorbing at least 90% of transmitted foreground image.

10. The system for producing apparent 3-dimensional viewing of claim 9 wherein said 60/40 perforation front projection screen is separated from said rear projection screen by a distance ranging from about 2 feet to about 30 feet.

11. The system for producing apparent 3-dimensional viewing of claim 9 wherein said 60/40 perforation front projection screen ranges in height from 2 feet to 80 feet and ranges in width from 3 feet to 110 feet.

12. The system for producing apparent 3-dimensional viewing of claim 9 wherein said rear projection screen ranges in height from 2 feet to 80 feet and ranges in width from 3 feet to 110 feet.

13. The system for producing apparent 3-dimensional viewing of claim 9 wherein said rear projection screen and said 60/40 perforation front projection screen are each about 45 feet in width and about 25 feet in height.

14. A method for producing apparent 3-dimensional viewing comprising the steps of:
   providing a means for projecting a foreground image;
   providing a means for projecting a background image;
   projecting said foreground image to a perforated front projection screen, said perforated front projection screen having a plurality of through hole perforations sized and spaced apart so that said front projection screen reflects a sufficient amount of said foreground image and transmits a sufficient amount of said background image for visualization by viewers positioned forward of said front projection screen;
   projecting said background image to a rear projection screen simultaneous with projecting said foreground image to said perforated front projection screen, and rear projection screen positioned parallel with said perforated front projections screen, and said rear projection screen being capable of receiving and transmitting a sufficient amount of said background image for visualization by said viewers and being capable of absorbing said foreground image transmitted from said perforated front projection screen;
   using as said perforated front projection screen a 60/40 perforation screen with a perforation size of about 2 mm and about 12 perforations per square centimeter; and
   wherein said rear projection screen transmits at least 90% of said background image and absorbs at least 80% of said foreground image.

15. The method for producing apparent 3-dimensional viewing of claim 14 wherein said perforated front projection screen and said rear projection screen are separated by a distance of about 25 feet, and said perforated front projection screen and said rear projection screen each are about 45 feet in width and about 25 feet in height.

16. A dual-screen apparatus for producing an apparent three-dimensional image when, with respect to a viewer of said apparatus, a foreground image is projected from the front of said apparatus onto the front surface of a first of said dual screens simultaneously with projection of a background image from the rear of said apparatus onto a rear surface of a second of said dual screens, said apparatus comprising:
   a perforate thin-film first screen having a front and a rear surface with respect to said viewer, said first screen having a film thickness of about 0.010 inch or less, a perforation ratio in the range of from 35 percent to 50 percent perforate, with perforations of from about 2 mm to about 4 mm size, and from about 10 to about 14 perforations per square centimeter;
   a second screen spaced behind and substantially parallel with said first screen, said second screen having a front and a rear surface with respect to said viewer, and absorbance in the range substantially of from 90 percent to 95 percent with respect to light incident on said front surface of said second screen, and a transmissibility substantially of from 90 percent to 95 percent with respect to light incident on said rear surface of said second screen, said second screen having a reflectance of substantially 10 percent or less with respect to light incident on said front surface of said second screen;
   whereby said first screen in correspondence with said perforation ratio reflects to said viewer a sufficient portion of said foreground image and transmits the remainder of said foreground image to said second screen, said second screen absorbing substantially 90 percent or more of said transmitted foreground image with no more than 10 percent of said transmitted foreground image being reflected by said second screen toward the rear surface of said first screen, and said first screen transmitting a correspondingly reduced part of said reflected foreground image to said viewer so that "ghosting" of said foreground image is prevented; and said rear screen transmits 90 percent or more of the background image toward said front screen which transmits a portion of said background image to said viewer in correspondence with said perforation ratio.

17. The apparatus of claim 16 wherein said first screen has a perforation ratio of 60/40.

18. The apparatus of claim 16 wherein said first screen has substantially 12 perforations per square centimeter.

19. The apparatus of claim 16 wherein said first screen has perforations of substantially 2 mm diameter.

20. A method of producing for a viewer having a direction of view, an apparent three-dimensional image; said method including the steps of;

using a first and a second projection means having respective opposite directions of projection;

with said first projection means projecting a foreground image on a front surface of a first screen, and with said second projection means projecting a background image on a rear surface of a second screen placed substantially parallel with and behind said first screen with respect to said viewer;

using as said first screen a perforate thin-film screen having a film thickness of about 0.010 inch or less, a perforation ratio in the range of from 35 percent to 50 percent perforate, with perforations of from about 2 mm to about 4 mm size, and from about 10 to about 14 perforations per square centimeter; and using as said second screen a screen having an absorptance in the range substantially of from 90 percent to 95 percent with respect to light incident on a front surface of said second screen, and a transmissibility substantially of from 90 percent to 95 percent with respect to light incident on said rear surface of said second screen, said second screen having a reflectance of substantially 10 percent or less with respect to light incident on said front surface of said second screen.

21. The method of claim 20 additionally including the steps of:

with said first screen reflecting to said viewer a sufficient portion of said foreground image and transmitting the remainder of said foreground image to said second screen in correspondence with said perforation ratio;

with said second screen absorbing substantially 90 percent or more of said transmitted foreground image while reflecting no more than 10 percent of said transmitted foreground image toward the rear surface of said first screen;

with said first screen transmitting a correspondingly reduced part of said reflected foreground image to said viewer so that "ghosting" of said foreground image is prevented;

with said rear screen transmitting 90 percent or more of the background image toward said front screen; and with said front screen transmitting a portion of said background image to said viewer in correspondence with said perforation ratio.

* * * * *